US010587594B1

(12) United States Patent
McClintock et al.

(10) Patent No.: US 10,587,594 B1
(45) Date of Patent: Mar. 10, 2020

(54) MEDIA BASED AUTHENTICATION

(71) Applicant: Amazon Technologies, Inc., Reno, NV (US)

(72) Inventors: Jon Arron McClintock, Seattle, WA (US); Darren Ernest Canavor, Redmond, WA (US); Jesper Mikael Johansson, Redmond, WA (US); George Nikolaos Stathakopoulos, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/494,520

(22) Filed: Sep. 23, 2014

(51) Int. Cl.
*H04L 29/06* (2006.01)
*G06F 21/31* (2013.01)
*G06F 21/45* (2013.01)

(52) U.S. Cl.
CPC .............. *H04L 63/08* (2013.01); *G06F 21/31* (2013.01); *G06F 21/45* (2013.01)

(58) Field of Classification Search
CPC ........................................................ H04L 63/08
USPC .............................................................. 726/4
See application file for complete search history.

(56) References Cited

U.S. PATENT DOCUMENTS

| 6,275,806 B1 * | 8/2001 | Pertrushin | G10L 17/26 |
| | | | 704/270 |
| 7,483,958 B1 * | 1/2009 | Elabbady | G06F 21/10 |
| | | | 709/217 |
| 2003/0135740 A1 * | 7/2003 | Talmor | G06F 21/32 |
| | | | 713/186 |
| 2004/0006701 A1 * | 1/2004 | Kresina | H04L 9/321 |
| | | | 713/189 |
| 2004/0029564 A1 * | 2/2004 | Hodge | H04M 3/38 |
| | | | 455/411 |
| 2005/0114357 A1 * | 5/2005 | Chengalvarayan | G11B 27/034 |

(Continued)

FOREIGN PATENT DOCUMENTS

| EP | 1785891 A1 * | 5/2007 | ....... G06F 17/30743 |
| WO | WO-2008065604 A1 * | 6/2008 | ........... G06F 16/783 |

OTHER PUBLICATIONS

International Organization for Standardization/ International Electrotechnical Commission, "Information technology—Trusted Platform Module—Part 1: Overview," International Standard, ISO/IEC 11889-1(E), May 15, 2009, 20 pages.

(Continued)

*Primary Examiner* — Peter C Shaw
(74) *Attorney, Agent, or Firm* — Davis Wright Tremaine LLP

(57) ABSTRACT

A service provider or service of the service provider may generate authentication information based on information provided by a user. The information provided by the user may include a selection of a media object, information indicating a segment of the media object, and an indication of an action to be performed by the user. This information may be saved by the service provider and used at some point in time later to determine whether to provide access to restricted computing resources based at least in part on an authentication claim provided by the user. The authentication claim may be generated by a computing device operated by the user and may include information corresponding to the media object, the indicated segment of the media object, and the action performed by the user.

21 Claims, 12 Drawing Sheets

(56) References Cited

U.S. PATENT DOCUMENTS

| | | | | |
|---|---|---|---|---|
| 2006/0034287 A1* | 2/2006 | Novack | ............... | G06F 21/32 370/395.2 |
| 2008/0256613 A1* | 10/2008 | Grover | ............... | G06F 21/32 726/5 |
| 2011/0234900 A1* | 9/2011 | Quan | ............... | G06K 9/00744 348/468 |
| 2011/0276486 A1* | 11/2011 | Kuba | ............... | G06Q 20/02 705/44 |
| 2011/0299721 A1* | 12/2011 | He | ............... | G06K 9/00744 382/100 |
| 2014/0282958 A1* | 9/2014 | Salonen | ............ | H04L 63/0861 726/7 |
| 2014/0310764 A1* | 10/2014 | Tippett | ............... | G06F 21/31 726/1 |
| 2016/0050197 A1* | 2/2016 | Panging | ............ | H04L 63/083 726/6 |

OTHER PUBLICATIONS

International Organization for Standardization/International Electrotechnical Commission, "Information technology—Trusted Platform Module—Part 2: Design principles," International Standard, ISO/IEC 11889-2(E), May 15, 2009, 152 pages.

International Organization for Standardization/International Electrotechnical Commission, "Information technology—Trusted Platform Module—Part 3: Structures," International Standard, ISO/IEC 11889-3:2009(E), 204 pages.

International Organization for Standardization/International Electrotechnical Commission, "Information technology—Trusted Platform Module—Part 4: Commands," International Standard, ISO/IEC 11889-4:2009(E), 254 pages.

Trusted Computing Group, "TPM Main, Part 1 Design Principles," Specification Version 1.2, Level 2 Revision 103, Jul. 9, 2007, 182 pages.

Trusted Computing Group, "TPM Main, Part 2 TPM Structures," Specification Version 1.2, Level 2 Revision 103, Jul. 9, 2007, 198 pages.

Trusted Computing Group, "TPM Main, Part 3 Commands," Specification Version 1.2, Level 2 Revision 103, Jul. 9, 2007, 330 pages.

Trusted Computing Group, "TPM Main, Part 1 Design Principles," Specification Version 1.2, Revision 116, Mar. 1, 2011, 184 pages.

Trusted Computing Group, "TPM Main, Part 2 TPM Structures," Specification Version 1.2, Revision 116, Mar. 1, 2011, 201 pages.

Trusted Computing Group, "TPM Main, Part 3 Commands," Specification Version 1.2, Revision 116, Mar. 1, 2011, 339 pages.

* cited by examiner

MEDIA BASED AUTHENTICATION

BACKGROUND

The use of computing services, such as remote data storage services and social networking services, has greatly increased in recent years. The service providers for these computing services may maintain user account integrity by requiring users to authenticate themselves to the service provider using user credentials. For example, a particular service provider may require a user to verify their identity by submitting the correct combination of user name and password. Furthermore, organizations may require entities of the organization to enter a user name and password combination to gain access to organizational resources.

Many current password-based authentication systems rely on the ability of the user to select his or her own password. However, users often do not choose strong passwords, and users often have difficulty remembering randomly-generated passwords. Due to this problem, user-selected passwords are often easily compromised by an attacker. To prevent user information from being easily compromised because of poor user-selected passwords, many authentication systems employ complexity requirements such as a minimum length of eight characters, at least one upper case character, at least one lower character and at least one non-alphabetic character. However, even these complexity requirements may not prevent users from selecting weak passwords. Even when adding additional complexity requirements users may still find a way around the complexity requirements and select weak passwords. For instance, the user may select a keyboard pattern that appears randomly generated, but may be easily attacked and compromised using modern techniques.

BRIEF DESCRIPTION OF THE DRAWINGS

Various embodiments in accordance with the present disclosure will be described with reference to the drawings, in which.

DETAILED DESCRIPTION

Figure 1:
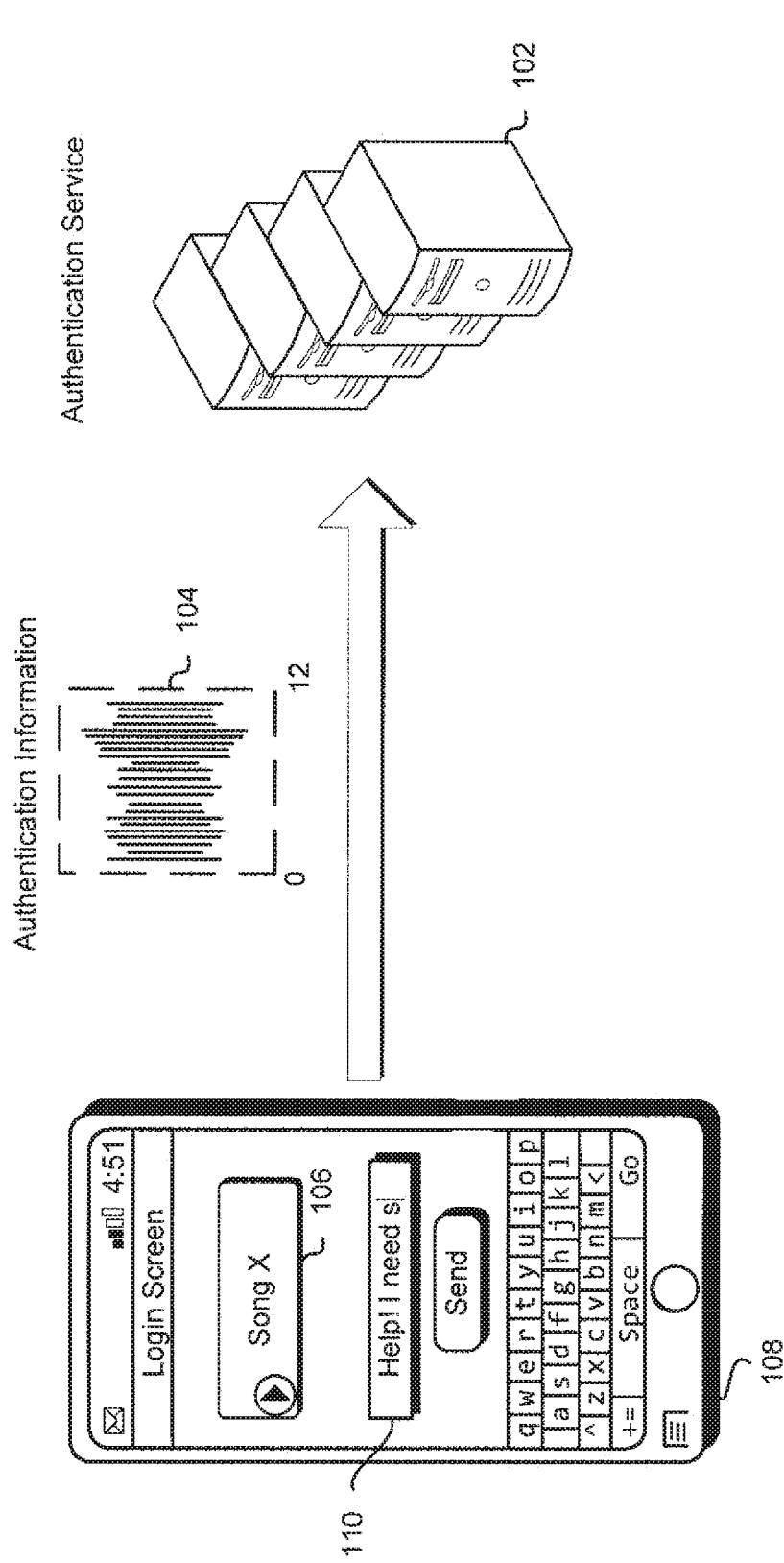
FIG. 1 is a diagram illustrating media based authentication in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to improvements to credential based authentication system including password creation, generation, and selection. A password may be used to represent information that can be inputted by a user into one or more user input devices for the purpose of authentication. Passwords or representations thereof may be saved by the password management service and used for authentication of the users. For example, during an authentication process a client device operated by a user may transmit authentication information to the password management service or other service for authentication. The authentication information may include the password, a hash of the password or other representation of the password suitable for authentication. Furthermore, the techniques described herein may be used with any authentication or security system which requires a password to gain access to restricted information and/or restricted computing resources. For example, the techniques described herein may be used by an online retailer or other service provider to improve password strength for customer accounts managed by the online retailer. In another example, organizations or administrators of an organization may use the techniques herein to improve security and mitigate password attacks on entities of the organization, such as employees.

The authentication systems described herein may utilize passwords based on audio and/or video objects in order to generate credentials for various users. For example, a password may be based on a particular song where the password comprises the song title of the particular song, a start point within the particular song, and a duration. In another example, the password may be based on a particular movie where the password comprises the title of the particular movie and dialog from a scene of the particular movie. A user may, through an interface of the authentication system, select a media object and provide additional information and the authentication system may generate a password based on the media object and the provided additional information. For example, the user may interact with the authentication system through a browser application executed by the user's computing device, described in greater detail below. The browser application may provide the user with a set of songs or other media objects (e.g., movies, television programs, or books) and the user may then select a particular song from the set of songs. The authentication system, through the browser application, may then prompt the user for additional information, such as a set of lyrics or other prose from the selected song.

This additional information may then be used as a password for the user when authenticating the user to the authentication system or other system or service. For example, the user may contact a customer service system and a customer service operator may request authentication of the user. The user may provide the customer service operator with the song title, start time, and duration of playback in order to authenticate the user. In addition, the user may be required to perform one or more actions to complete authentication. For example, the user may provide the song title, start time, and duration of playback and perform an action associated with the selected song. The performance of the action may require the user to tap in rhythm or time with the song, sing or otherwise speak a set of lyrics from the song, or other action corresponding to the song or the additional information provided. In another example, the user's reaction to the song may be captured using one or more sensors of a computing device (e.g., a front facing camera of a mobile device) and used in authenticating the user.

Furthermore, the authentication mechanisms described herein may be used for device registration and/or user account registration as well. For example, a user may purchase a device from an online retailer and may select a particular movie and lines from a particular scene in the movie to use during authentication for a registration of the device. The device may then be configured to display a set of movies during an initial boot of the device or initialization of the device. Initialization of the device may include boot operations or other operations configured to enable operation of the device, such as loading instructions into memory, executing instructions, or determining the state of the device or components thereof. The user may select the particular movie and the lines from the particular scene through an interface of the device. Information corresponding to the user selection may be provided to an authentication system for verification that the user's selection matches the information provided by the user at the time of purchase. Once the information selected by the user has been authenticated, the device may be registered to the user and/or associated with the user's account maintained by the online retailer. The use of the authentication mechanisms described herein, in many examples, helps increase the efficiency of computer systems and reduce errors during the authentication operation performed by users of various computer systems. Other advantages may include some or all of increased security, increased password entropy, secure device registration, fewer errors, and improved interface between humans and computer systems during authentication and registration.

FIG. 1 illustrates an example environment 100 where one or more computer systems, as well as the associated code running thereon, may provide authentication information 104 to an authentication service 102. The authentication service 102 may be a stand-alone service or may be part of a service provider or other entity. The authentication service 102, in an embodiment, is a computer system (i.e., collection of computing resources) configured to perform operations involved in authentication of users. For instance, a service provider or other service may provide information from a user or require the user to provide information to the authentication service 102, so that the service provider or other service may receive information in return that indicates whether the user requests are authentic. The authentication information 104 may include a variety of different information suitable for authenticating a user and/or a device described in greater detail below. The authentication service 102 or other service may prompt the user for authentication information 104 by providing the mobile device 108 with a challenge 114. The challenge 114 may be a question directed to a user of the mobile device 108, such as "Please provide your authentication information." 104 described in greater detail below. The challenge 114 may be provided for a variety of different reasons; for example, the mobile device 108 may be attempting to access restricted resources of the service provider. In another example, the user, through an input device of the mobile device, may communicate with a customer service representative. The customer service representative may then, through his/her own computing device, provide the mobile device 108 with the challenge 114 to authenticate the user to the customer service representative. The authentication information 104 may then be provided to the customer service representative in response to the challenge 114 and the customer service representative may validate the authentication information 104. For example, the authentication information 104 may include a recording of the user to be validated by the customer service representative based at least in part on a previous recording of the user.

The user may provide an authentication claim to the authentication service 102, the authentication claim may be generated using the authentication information 104. The authentication information may be a collection of information forming an authentication claim that is necessary and/or sufficient for authentication to a system for which authentication is required for at least some access. As an illustrative example, authentication information may be an encoding of a song title, start point for playback, duration of playback, and possibly other information necessary and/or sufficient for authentication. Furthermore, the authentication information 104 may be provided over a communications network such as the Internet. The user may provide the authentication information using a variety of different computing devices, such as a mobile device 108 as shown in FIG. 1. In various embodiments, the authentication reference information may be sufficient to validate the authentication claim.

The user may utilize an application and/or interface of the computing device in order to select a song 106 and provide additional authentication information, as described above. As illustrated by FIG. 1, for example, the mobile device may include a touchscreen on which a keyboard is displayed which enables a customer to input authentication information 104, such as song lyrics 110. Although a song 106 and song lyrics 110 are show in FIG. 1, a variety of different media objects and additional information may be used in accordance with the present disclosure. For example, the media object used to generate the authentication information may include audio and/or video. The additional information may include any additional information corresponding to the media object, such as start point, duration, user reaction to the playback of the media object, text, actions captured by sensor device, and signature of the media object. The authentication information 104 inputted by user into the mobile device 108 may be provided to the authentication service 102. The authentication service 102 may determine if the received authentication information 104 is valid.

The authentication information 104 may comprise a password. The password may be generated by the authentication service 102 based at least in part on information provided by the user, described in greater detail below. Example passwords include, but are not limited to: passphrases, passcodes, pins, words, strings, names, numbers, characters, ordered collections of symbols, unordered collections of symbols and/or combinations or transformations of these including hashes. In various embodiments, the authentication service 102 generates authentication reference information useable in determining if an authentication claim provided by a user is valid. The authentication information may include information corresponding to the media object, additional information, and the action to be performed. For example, the authentication reference information may be a record in a database containing the authentication information 104 provided by the user, such as a selected song title, start point for playback, and duration of playback. The authentication service 102 may then determine if the authentication claim is valid by at least comparing the authentication claim to the authentication reference information.

In another example, the authentication information may include an audio fingerprint or video fingerprint derived from a media object selected by the user. An audio fingerprint or video fingerprint may be a condensed digital summary, deterministically generated from an audio signal or video signal, that may be used to identify an audio sample or video sample or quickly locate similar items in a media object database. The media object database may contain a set of records comprising audio fingerprints and/or video fingerprints and information corresponding to the audio fingerprints and/or video fingerprints, such as song titles, movie title, composer, and other information relating to the audio and/or video signal the fingerprint is derived from. The finger printed may be derived using a Fourier transform in order to transform the audio and/or video signal from time (or spatial) domain and frequency domain.

Figure 2:
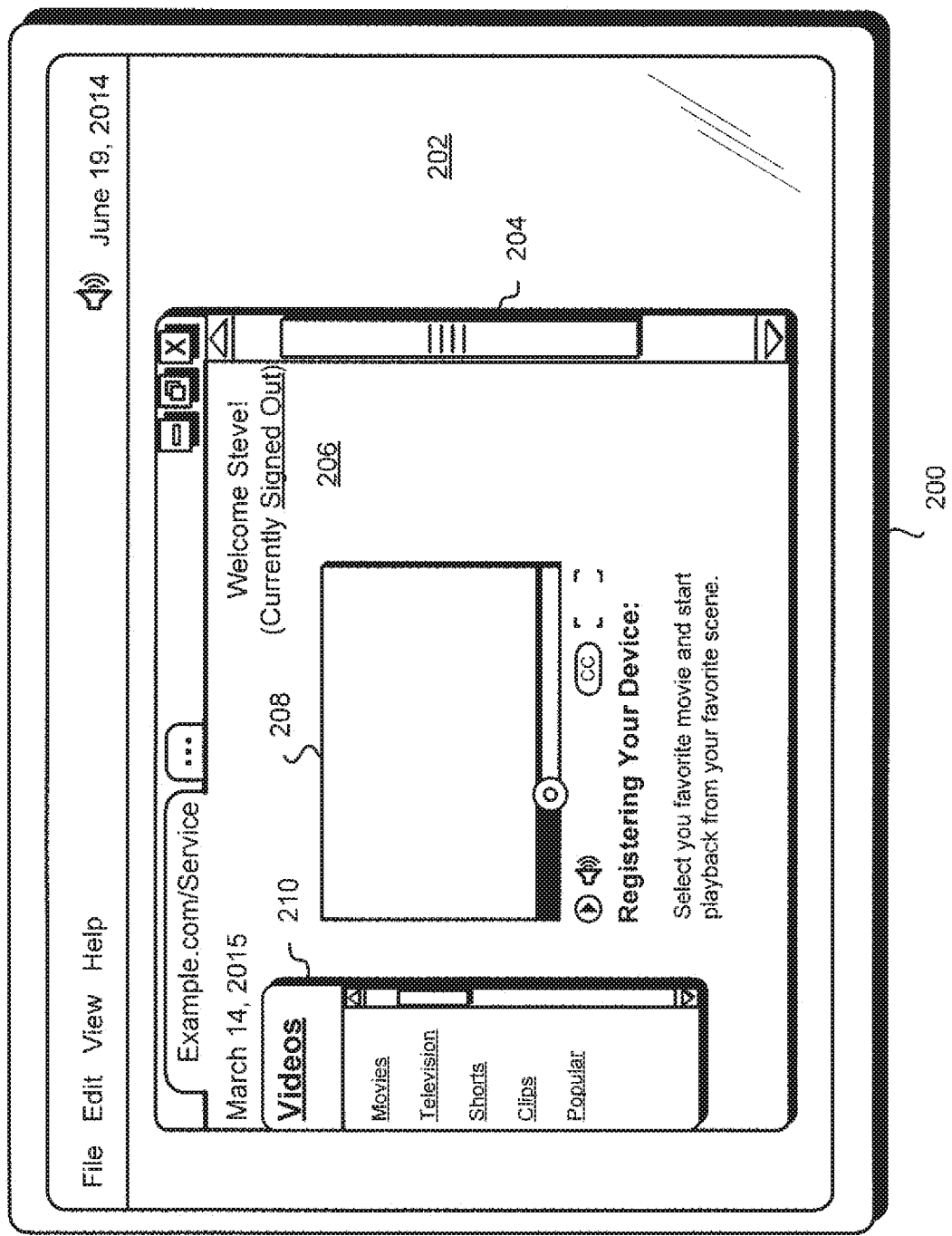
FIG. 2 is a diagram illustrating media based registration of a device and/or user account in accordance with an embodiment.

As discussed, various embodiments of the present disclosure provide for authentication and registration based at least in part on a selected media object such as an audio and/or video clip. FIG. 2 accordingly shows an illustrative example of a variation of the techniques described herein in accordance with various embodiments. In particular, FIG. 2 shows a display device 200, which displays a user interface 202. The display device may be, for example, a computer monitor of a notebook or personal computer, a display of a mobile device, a display of a tablet computing device, or otherwise a display of a computing device. In an embodiment, the user interface 202 is provided by an operating system of a computing device causing the user interface 202 to be displayed. In the particular example illustrated in FIG. 4, a display of an application 204 is displayed on the user interface 202. The application 204 may be, for example, the web browser application described in greater detail below in connection with FIG. 4.

In this particular example, the application 204 provides a registration screen 206 for display. The registration screen 206 may be presented, for example, to enable a user to access authentication information, such as a video 208 provided to enable the user to authenticate the user and register the computing device with the user's account maintained by a service provider. The registration screen 206 may include, for instance, on the left-hand side of the registration screen 206, various links 210 to one or more other screens that contain additional content corresponding to a variety of different services or features of the computing device and/or service provider. The video 208 may be selected from a set or list of videos displayed to the user through the application 204. Additionally, the user may be required to provide additional information using the interface 202 and/or the application 204. For example, as illustrated in FIG. 2, the user may be required to set a start point for the video 208 using a seek bar or other slider associated with the video 208. In some embodiments, the video 208 may be segmented or otherwise split into sections, for example split into scenes, to facilitate the user selection of a start point.

In some embodiments, the application 204 may include programming logic or source code configured to detect a computing environment associated with display device 200. The computing environment may include hardware and software elements. For example, the computing environment may include information corresponding to the computer system the display device 200 is part of, such as the notebook computer described above. Furthermore, the computing environment may also include information corresponding to hardware devices connected to the computing device such as cameras or sensors. In various embodiments, the cameras and sensors may be used to capture information corresponding to the user to include as additional information when authenticating and/or registering the computing device. For example, the user's reaction to playback of the video 208 may be captured by one or more sensors and provided to the authentication service. The authentication service may compare the captured information to a previously recorded user reaction to playback of the video 208.

The authentication information required to authenticate the user and/or register the computing device may be established at some point in time prior to attempting to register the device as illustrated in FIG. 2. For example, creation of a user account with the service provider may require the user to select a particular media object, a start point within the selected media object, and a duration for use as the user's password and/or authentication information. In another example, a retailer may provide the computing device for sale, and the user may be required to select the authentication information at the time of sale of the computing device. Selection of the authentication information and/or components thereof as well as generation of passwords based at least in part on the selected authentication information are described in greater detail below in connection with FIGS. 4 and 5. In various other embodiments, the authentication service transmits an authenticator to the computing device; the authenticator may be configured to register the computing device with the service provider when included in authentication information returned to the authentication service. For example, the authentication service may provide the computing device with a five-second clip of a song; the computing device may play back the five-second clip and provide the authentication service with authentication information corresponding to the clip, such as an audio fingerprint or a recording of the playback. The authentication service may then determine a user account to register the device to based at least in part on the authentication information. In another example, the computing device may determine the user account to register the device to based at least in part on the authentication information.

Figure 3:
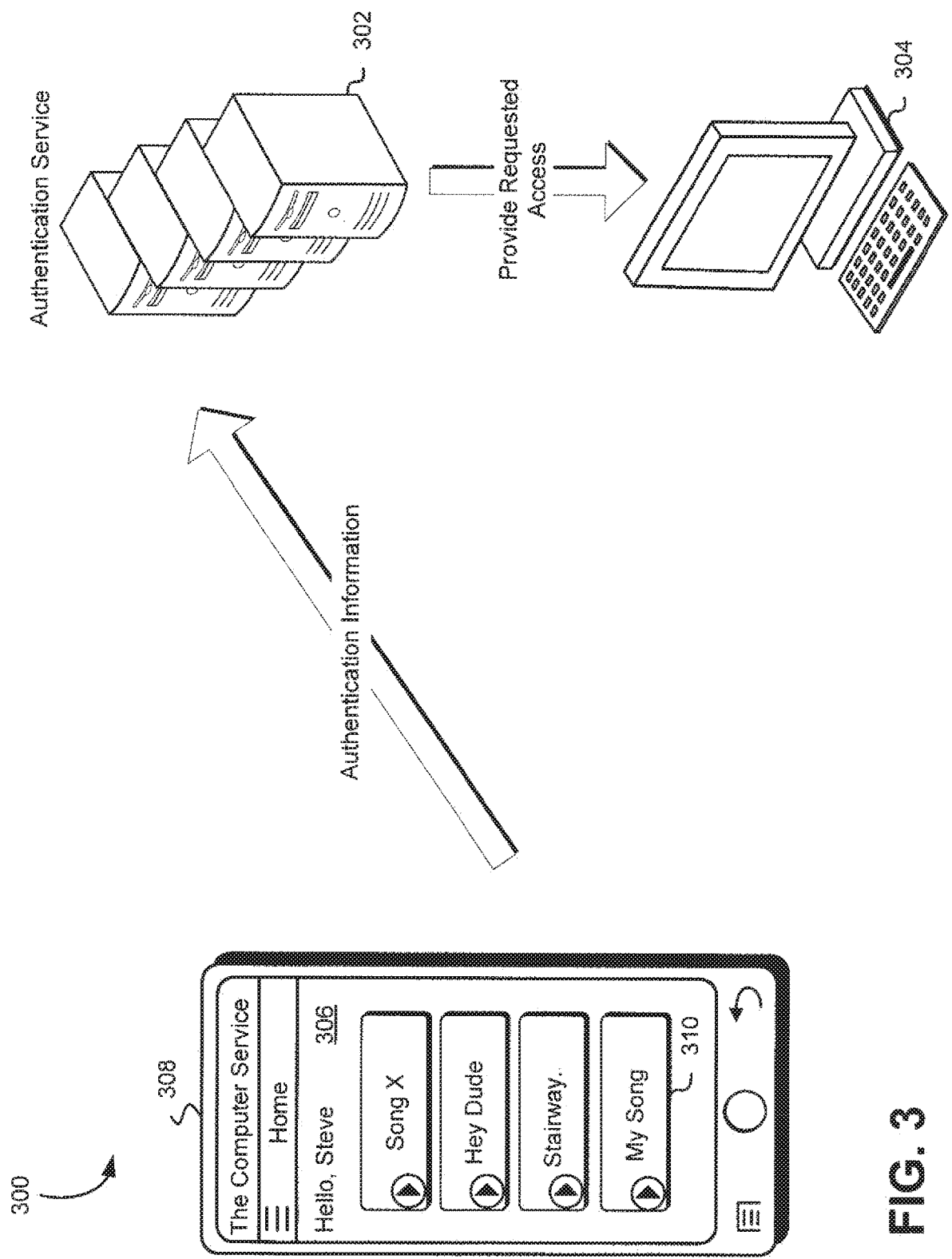
FIG. 3 is a diagram illustrating two factor authentication using media based authentication in accordance with an embodiment.

FIG. 3 illustrates an example environment 300 where one or more computer systems, as well as the associated code running thereon, may provide authentication information to an authentication service 302 in response to a request to access restricted computing resources from a second computing device 304. The authentication service 302 may be an authentication service as described above in connection with FIG. 1. The second computing device 304 may be any suitable computing device such as a notebook, a personal computer, a mobile device, a tablet computing device, or other similar computing device capable of requesting access to one or more restricted computing resources. For example, the second computing device 304 may request access to a service of a service provider that requires authentication by the authentication service 302. The authentication service 302 and/or the service provided may be configured to require the user to provide authentication information from a first computing device 308.

The user may provide through an interface 306 of the first computing device 308 authentication information. The authentication information may include a password comprised of a selected media object 310, additional information, and one or more actions taken by the user. As described above, the user may select a song, provide a start point and duration, and may be required to sing missing lyrics with high fidelity timing. For example, the user may select song "Hey Dude" through an interface 306 of the first device as illustrated in FIG. 3. The first device 308 may then begin playback of the selected song and capture the user singing the lyrics of song through a microphone attached to the first computing device 308. Furthermore, playback of the song may be configured such that certain lyrics or portions of the song are not played and must be provided by the user. For example, song lyrics of the user selected song may include "we will, we will, shock you," and the user may be required to provide a portion of the lyrics through an input device of the first computing device 308 such as a keyboard or microphone. In various embodiments, the user provides a start point and duration of playback for the selected song.

Figure 4:
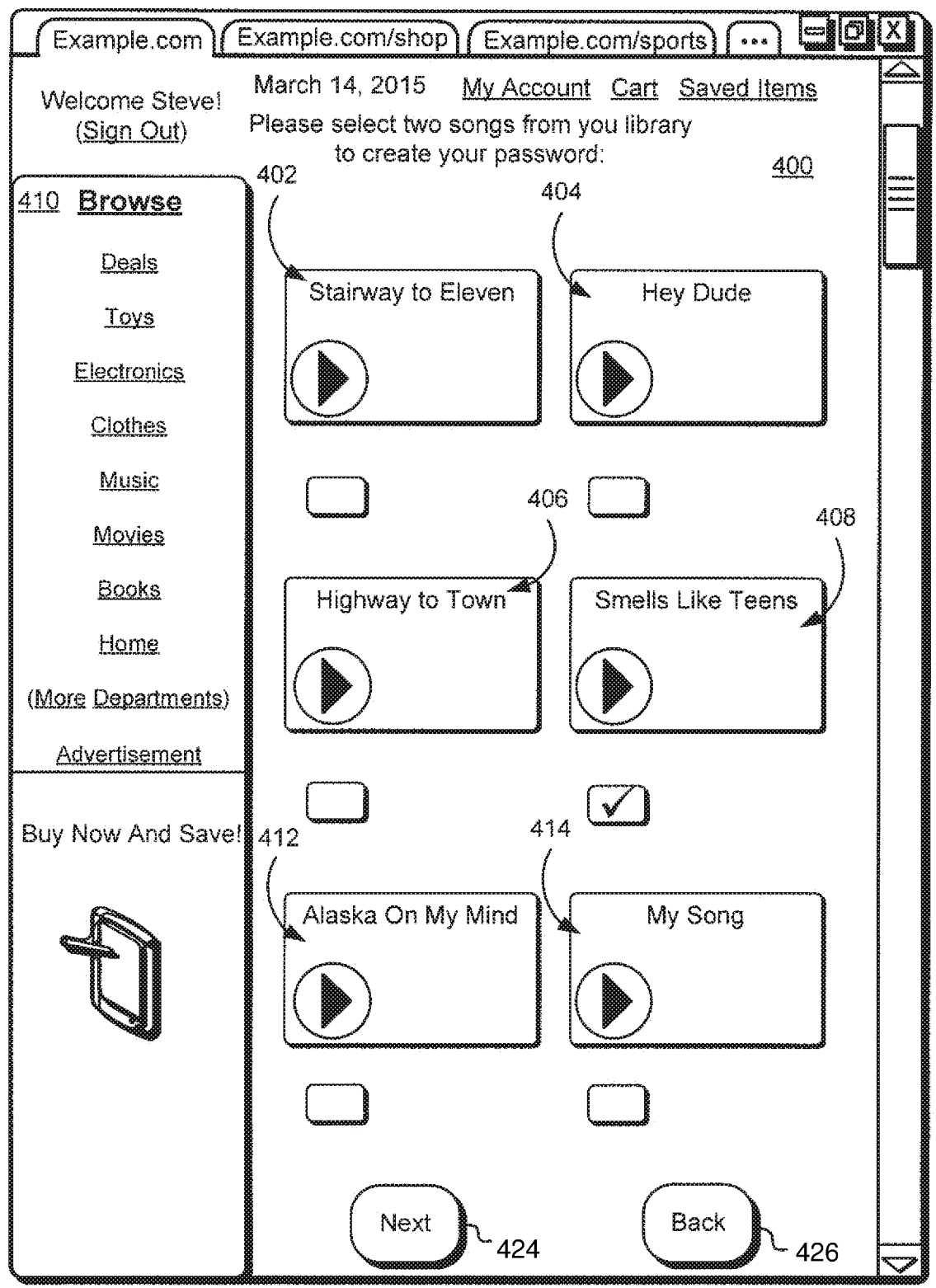
FIG. 4 is a diagram illustrating a webpage for selecting information useable as a media based authentication password in accordance with an embodiment.

FIG. 4 shows a webpage 400 which may be displayed by an application executed by a computing device enabling a user to interact with a password management service operated by an online retailer or other organization. The password management service may be a component of the authentication service as described above. In various embodiments, the password management service may be a component of the online retailer or other organization and may provide authentication information to the authentication service, the authentication information useable in authenticating the user. As illustrated in FIG. 4, the webpage 400 includes various graphical user interface elements that enable navigation throughout the electronic commerce website of which the webpage 400 is a part.

The webpage 400 may be displayed by various applications, such as a mobile application or web browser. In this example, the webpage 400 includes various navigational features. For instance, on the left-hand side of the webpage 400, various links 410 may link to one or more other webpages that contain additional content corresponding to department pages and/or category pages. The department and/or category pages may correspond to department and category information used by the product information service. In this example, the links appear as textual words which enable the links to be selected using an appropriate input device such as a keyboard, mouse, touchscreen or other input device. Selection of one of the links 410 may cause an application displaying the webpage 400 to submit, pursuant to a URL associated with the selected link by the programming of the webpage 400, an HTTP request for the content associated with the link to a server that provided the webpage 400 or another server.

In this example, the webpage 400 also includes a graphical user element configured as a "next" button 424. The next button 424 may be a graphical user interface element of the webpage 400 where the underlying code of the webpage 400 is configured such that selection by an input device of the next button 424 causes information corresponding to a selection of a particular song by the user to be transmitted to the password management service. The selected song may be used by the password management service in generating authentication information for the user. For example, an audio fingerprint, as described above, may be generated based at least in part on the selected song. Additionally, the selected song may be used by the password management service in another webpage configured to receive additional information from the user. For example, the selection of the next button 424 may cause the application displaying the webpage 400 to submit, pursuant to a URL associated with the selected next button 424 by the programming of the webpage 400, an HTTP request for the other webpage containing a set of lyrics from the selected song. For example, the other webpage may contain a graphical representation of the songs including lyrics or sets of lyrics that are selected by a user using an input device. The user may then provide the additional information by providing selected lyrics of the set of lyrics through an interface of the application as described in greater detail below in connection with FIG. 5.

The webpage 400 also includes a graphical user element configured as a "back" button 426. The back button 426 may be a graphical user interface element of webpage 400 where the underlying code of webpage 400 is configured such that the selection by an input device of the back button 426 causes the user to be redirected to one or more previously navigated webpages. The use of songs in FIG. 4 is for illustrative purposes and any other media object or attributes of media may be used in accordance with the present disclosure. Media objects may include movies, podcasts, video clips, television programs or series, audio and video of recorded events, live broadcasts, or any other audio signal, video signal, or combination thereof suitable for use in authenticating a user. Furthermore, other attributes of media may include book titles, authorship information, quotes, clips, composer, producer, actor, performer, or any other attributes of a particular piece of media.

The webpage 400 may also include a graphical user element configured as radio buttons or check boxes corresponding to songs useable in generating authentication information. The radio buttons may be a graphical user interface element of the webpage 400 where the underlying code of the webpage 400 is configured such that selection by an input device of one or more of the radio buttons causes information corresponding to the songs displayed on the webpage 400 to be recorded or otherwise stored for use by the password management service. In this example, the webpage 400 contains six songs "Stairway to Eleven" 402, "Hey Dude" 404, "Highway to Town" 406, "Smells Like Teens" 408, "Alaska On My Mind" 412 and "My Song" 414.

The songs may be included in webpage 400 based at least in part on information associated with the user and/or the popularity of the songs among other users of the organization. For example, the songs may be included in a library associated with the user or may be the most frequently played songs by the user. Other indicators of the user's favorite songs may be used to determine the songs to include in webpage 400. For example, the songs included in the webpage 400 may be selected from a set of songs where, during playback of the song, the user turns up the volume, rewinds the song, or repeats the song. The user may also indicate favorite songs by rating songs on a scale or simply approving or disapproving of particular songs. If there is insufficient information to determine a set of favorite songs or insufficient favorite songs, the webpage 400 may include one or more songs selected by the organization using other criteria. The other criteria may include random or pseudorandom selections, favorites of other users, or other suitable criteria for selection songs to include in webpage 400. The user may also have the option to receive a new set of songs to use in generating the authentication information.

The password management service may receive the user selected song and request additional information from the user in order to generate the authentication information. The song title, lyrics, composer, band, producer, production company and other information associated with the song may be used as additional information from which the authentication information is generated. In the example illustrated in FIG. 4, the additional information may include information relating to the user selected song "Smells Like Teens" 408, such as lyrics from the song and/or a particular point during playback at which lyrics occur. The generated authentication information may be presented to the user using a variety of techniques including those not specifically described herein. The user may then be provided with the option of selecting the authentication information for use in authenticating the user and/or registering devices or selecting a new song or other media object.

Figure 5:
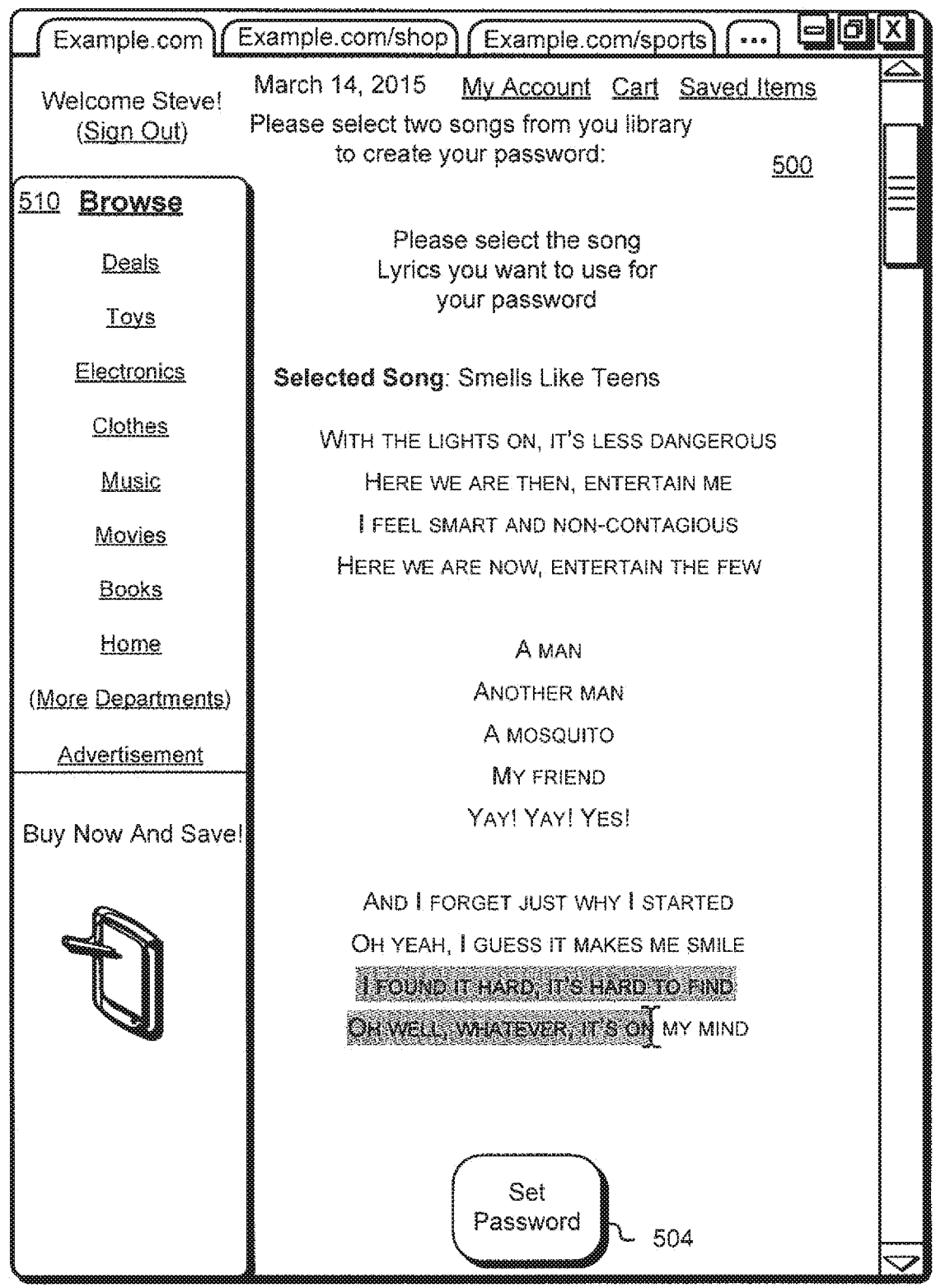
FIG. 5 is a diagram illustrating a webpage for providing a media based authentication password in order to authenticate a user in accordance with an embodiment.

FIG. 5 shows a webpage 500 which may be displayed by an application executed by a computing device enabling a user to interact with a password management service operated by an online retailer or other organization. The password management service may be a component of the authentication service as described above. In various embodiments, the password management service may be a component of the online retailer or other organization and may provide authentication information to the authentication service, the authentication information useable in authenticating the user. Furthermore, the password management service may communicate with one or more other services in order to obtain information relating to the media object selected by the user as described above in connection with FIG. 4. For example, the password management service may communicate with a media service to obtain song lyrics from the user selected song. As illustrated in FIG. 5, the webpage 500 includes various graphical user interface elements that enable navigation throughout the electronic commerce website of which the webpage 500 is a part.

The webpage 500 may be displayed by various applications, such as a mobile application or web browser. In this example, the webpage 500 includes various navigational features. For instance, on the left-hand side of the webpage 500, various links 510 may link to one or more other webpages that contain additional content corresponding to department pages and/or category pages. The department and/or category pages may correspond to department and category information used by the product information service. In this example, the links appear as textual words which enable the links to be selected using an appropriate input device such as a keyboard, mouse, touchscreen or other input device. Selection of one of the links 510 may cause an application displaying the webpage 500 to submit, pursuant to a URL associated with the selected link by the programming of the webpage 500, an HTTP request for the content associated with the link to a server that provided the webpage 500 or another server.

In this example, the webpage 500 also includes a graphical user element configured as a "set password" button 504. The set password button 504 may be a graphical user interface element of the webpage 500 where the underlying code of the webpage 500 is configured such that selection by an input device of the set password button 504 causes the password management system to use the additional information provided by the user along with the previously selected song to generate authentication information. In the example illustrated in FIG. 5, the user has selected, using an input device, a portion of the lyrics from the song "Smells Like Teens," which may have been previously selected using a suitable mechanism such as the webpage described above. Although song lyrics are shown in FIG. 5, other additional information may be provided by the user in accordance with the present disclosure, such as movie quotes. For example, the user may provide a start time and an end time for playback using a seek bar displayed in webpage 500. In another example, the user may select lines of dialog corresponding to a movie or video clip previously selected by the user. In another example, the additional information may be audio or video capture by the computing device displaying webpage 500. For example, audio of the user reading information displayed in webpage 500 may be captured by an input device and used as additional information in generating the authentication information by the password management service.

Furthermore, the user may select additional actions to be performed during authentication using webpage 500. For example, the user may select particular lyrics to sing during authentication. In another example, the user may select a portion of the previously selected song for which the user is to tap out the rhythm of said song during authentication. These actions may be captured using one or more sensors and recorded. During authentication of the user and/or registration of a user device the recorded actions may be compared to information provided by a computing device operated by the user, described in greater detail below. The user may be prompted to provide information to the password management service in order to generate authentication information as a result of a variety of different operations. For example, the user may be required to generate authentication information as a result of creating a user account. In another example, the user may be required to generate authentication information as a result of purchasing a device. Furthermore, the authentication information may be used as secondary or additional information during an authentication operation. For example, the user may be required to provide a username and password as well as the authentication information during an authentication operation.

Figure 6:
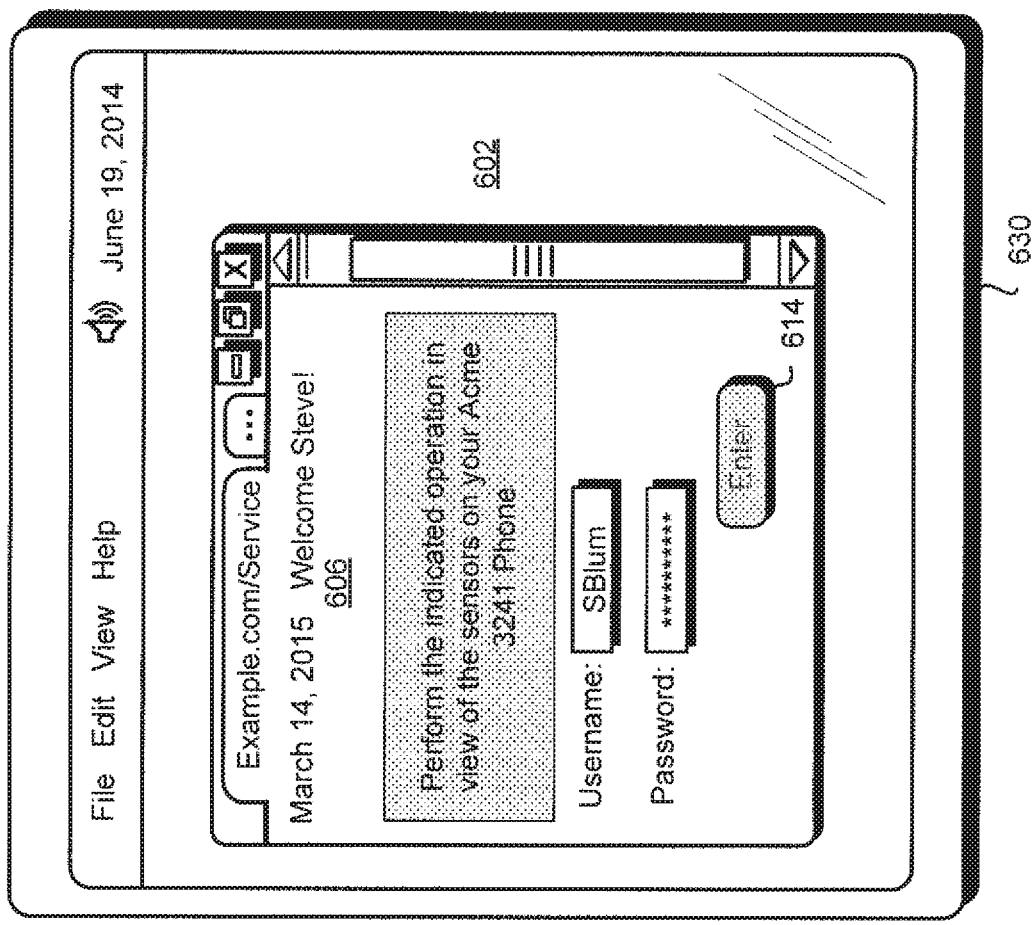
FIG. 6 is a diagram illustrating a user performing an additional action as part of a media based authentication process in accordance with an embodiment.
Figure 6:
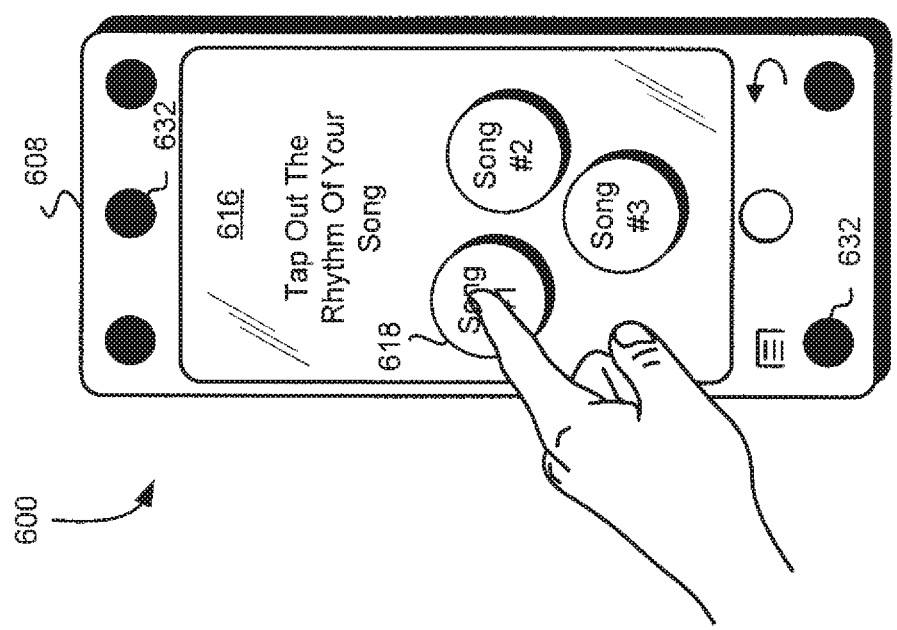

As noted above, the authentication service may require information corresponding to the environment to be collected by a mobile device 608 using one or more sensors. FIG. 6, for example, shows an illustrative example environment 600 of an embodiment enabling use of one or more sensors to collect information usable in authentication by the authentication service. Environment 600 may include a mobile device 608. The mobile device 608 may be the computing device described below in connection with FIG. 11 or may be a computing device incorporating components of the device described above in connection with FIG. 11. For example, the mobile device may be a smartphone or tablet computing device, although the techniques described in connection with FIG. 6 are not limited to such devices. Furthermore, the mobile device 608 may include one or more cameras 632. The cameras 632 may include a flash or other light emitting device such as a light emitting diode (LED). The cameras 632 may be configured to capture information during the execution of one or more action utilizing an authentication application executed by the mobile device 608. The authentication application may be an application, as described above, executed by the mobile device and configured to provide the authentication service with authentication information In some embodiments, for example, the user may perform a tapping operation requiring the user to tap in rhythm with a song 618. As illustrated in FIG. 6, the mobile device 608 may provide authentication information to an authentication service as additional information to a username and password provided by the user. Furthermore, the username and password may be provided by a computer system other than the mobile device 608. The computer system may include a display device 630, and the display device 630 may be a device as described above in connection with FIG. 2 configured to display information generated by the computer system connected to the display device 630. Returning to FIG. 6, as a result of the user tapping the rhythm of the song 618, the web page 606 may cause one or more operations to occur. In some embodiments, the username and password fields are populated to enable a user to select a enter button 614 to submit the credentials to a system for verification. In other embodiments, the effect of tapping the rhythm of the song 618 may cause authentication information corresponding to the song 618 to be submitted to the authentication service.

During the tapping operation described above, one or more cameras 632 on the mobile device 608 may capture the movement or other information corresponding to the user and or environment in order to add additional information to the authentication information. For example, the cameras 632 may detect the user's hand or other object used to complete the drag and drop operation. Furthermore, the cameras 632 may enable detection of the motion of the user's hand obviating the needs for the screen 616 of the mobile device 608 to be a touch screen or the need of the user to tap the screen to the rhythm of the song 618. Furthermore, the placement of a graphical element representing the song 618 on the screen 616 of the mobile device 608 may be correlated with the location of the user's hand based at least in part on information captured by the cameras 632. The cameras 632 may also be used to determine location of the user's hand during tapping operation and correlated with the location of the graphical element representing the song 618 in order to provide stronger authentication. Furthermore, an additional action may require the user to draw a particular pattern on the screen 616 of the mobile device 602, and the pattern may correspond to a media object selected by the user. The cameras 632 may then track the path taken by the user's finger to ensure that the user traced the correct path. If the mobile device 608 includes a touch screen, the information collected by the cameras 632 may be checked against information collected by the touch screen. Similarly the user may be required to draw their signature on the screen of the mobile device 608 in order to provide additional authentication information.

The cameras 632 may also capture other information from the environment such as the user's face or information displayed and/or outputted by the mobile device 608 or display device 630. By capturing information corresponding to the user's face the user's reaction to playback of the media object may be recorded and compared by the authentication service to a previously recorded reaction. In another example, the cameras 632 may capture light emitted by the mobile device 608 or display device 630. Furthermore, the service provider may indicate a particular pattern of light, including light in a spectrum not visible to humans, to be displayed by the mobile device 608 or display device 630 and captured by the cameras 632. For example, the cameras 632 may capture light emitted as a result of the play back on a video clip on the screen 616. The cameras 632 may also capture the pattern of infrared light and include information corresponding to the captured pattern in the authentication information. In various embodiments, a computing device other than the mobile device 608 may be responsible for capturing the particular pattern of light. For example, the computing device and/or display device 630 may include one or more cameras, and the one or more cameras may then capture the light emitted by the mobile device 608. The information captured by the one or more cameras may then be included in the authentication information received from the mobile device 608 or transmitted to the service provider for authentication.

Furthermore, the cameras 632 may be used to capture information useable to detect action relating to the song 618, by the user, in three dimensions. The mobile device 608 may also contain a three-dimensional display enabling users to interact with the song 618 in various ways. The mobile device 608 may also perform liveness detection to prevent against various attacks, such as a spoofing attack. For example, the mobile device 608 may turn off the blue image sensor of the cameras 632 and detect the heartbeat of the user operating the mobile device 608. The mobile device 608 may, using the cameras 632, obtain information corresponding to the computing environment of the mobile device 608 and the display device 630. The information may include any information suitable for authentication of the user and/or registration of computing devices with the service provider. For example, the mobile device 608 may obtain an image of the user's face suitable for facial recognition capable of authenticating the user. In various embodiments, the mobile device 608 may determine if the authentication information is valid during various operations such as mobile device 608 unlock. For example, unlocking the mobile device may require the users to tap out the rhythm of a selected song as illustrated in FIG. 6.

Figure 7:
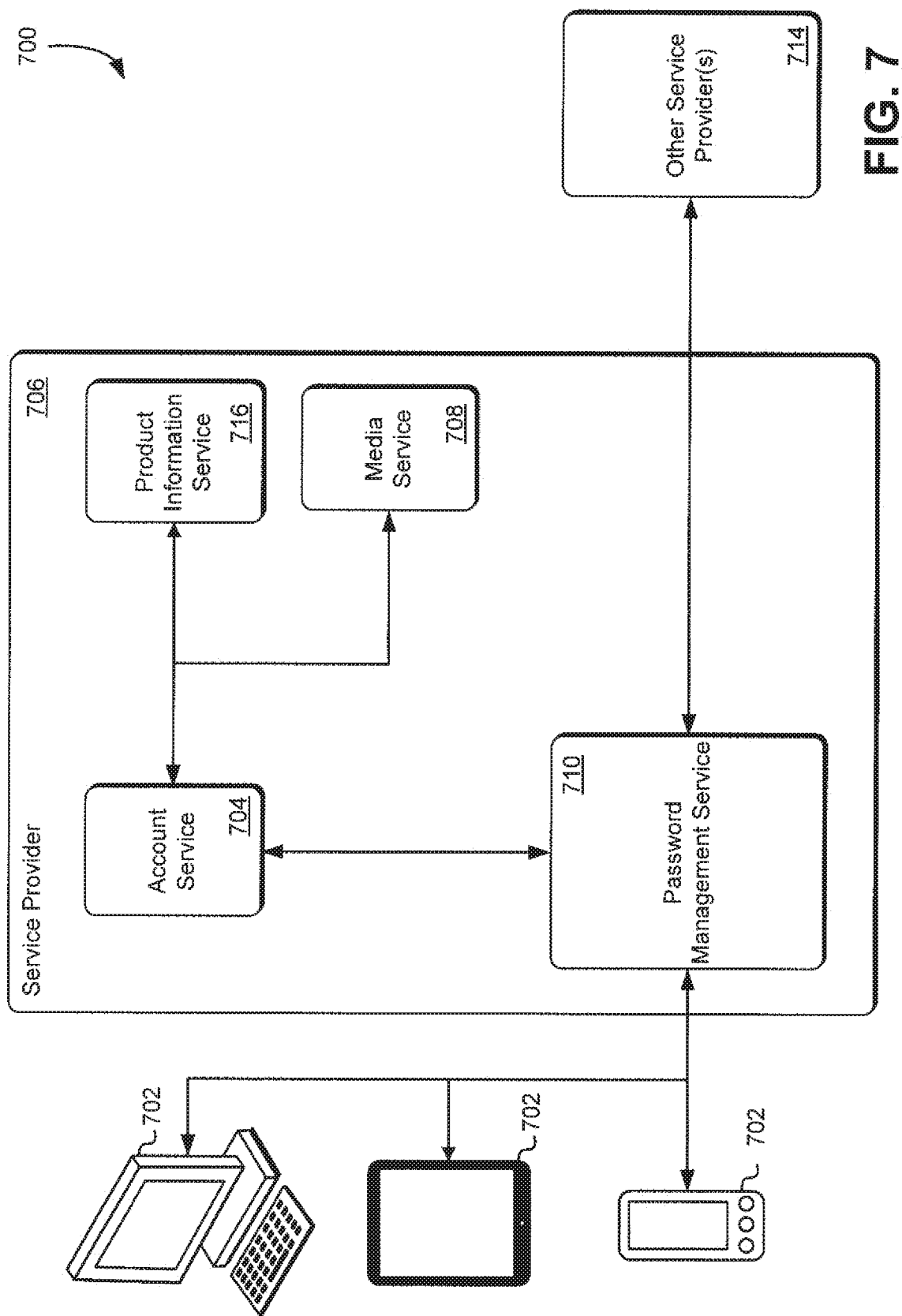
FIG. 7 is a diagram illustrating password management in accordance with an embodiment.

FIG. 7 shows an environment 700 in which users can connect to a service provider 706 in order to generate authentication information and populate the authentication information to one or more other services. Users can connect to the service provider 706 through one or more computing devices 702. The computing device 702 may include personal computers, smartphones, tablets, or any other computing device capable of connecting to service provider 706. The computing device may transmit data over a network to a password management service 710 operated by the service provider 706. In various embodiments, the password management service 710 validates authentication information received from the computing devices 702. One or more other services of the service provider 706 may be responsible for authenticating users, such as the authentication service described above. The password management service 710 may also receive requests to generate authentication information from the computing devices 702 or other service providers 714. Furthermore, users operating computing devices 702 may be directed to the password management service 710 for a variety of reasons including the user has created a new account, the user has purchased a particular device, the user has reset their user password a number of times within a certain period, the user had their password compromised a certain number of times, an administrator setting, an updated security policy or any other reason suitable for requiring a user to establish authentication information.

The password management service 710 may be a collection of computing resources collectively configured to generate authentication information based at least in part on a media object, additional information provided by a user, and/or one or more actions to be performed by the user. For example, the password management service 710 may be a computer system connected over a network to the user and one or more other computer systems in order to receive authentication information requests and information associated with the authentication information requests. The request may include an indication of the user selected media object and/or additional information provided by the user, such as a start point for play back of the media object. The password management service 710 may also communicate with one or more other services of the service provider 706 in order to obtain information corresponding to the user selected media object or otherwise obtain information useable for generating authentication information. For example, the password management service 710 may communicate with an account service 704, a product information service 716, or a media service 708.

The account service 704 may be a collection of computing resources collectively configured to maintain and manage information corresponding to user accounts, users, services and other information corresponding to users or the service provider 706. For example, the account service 704 may be a computer system responsible for maintaining user information such as user location, date of birth, name, address, contact information, credit card information, purchased products, favorite songs, favorite movies, or other information associated with users of the service provider 706. Information associated with the users may include performance reviews or other information about the actions of the users. The account service 704 may also receive requests from the password management service 710 for information corresponding to a particular user or one or more seed values indicated by a particular user. For example, the password management service 710 may request additional information from the account service 704 corresponding to a particular user's library of media objects. The information may be used to provide the user with a set of media object to select from to be used to generate authentication information on behalf of the user.

The account service 704 may also request information from one or more additional services. For example, the account service 704 may request product data and/or other product information from the product information service 716. The product information service 716 may collect information corresponding to goods or services offered for consumption on an electronic marketplace operated by the service provider 706. The product information service 716 may also store information corresponding to particular media objects particular users have consumed through the online marketplace. For example, the product information service 716 may store information corresponding to all songs a particular user has caused playback of, using computing device 702. Furthermore, the product information service 716 may collect indicators of a user's preference for media objects. For example, as described above, the user may increase the volume of a particular portion of a song during playback. The password management service 710 may use the information received from the product information service 716 to generate the authentication information as described above in connection with FIG. 1.

The account service 704 may also request information from the media service 708 for use in generating authentication information by the password management service 710. The media service 708 may be a collection of computing resources collectively configured to retrieve one or more media objects for use with the password management service 710 including text, audio, or video. The media service 708 may also contain one or more storage systems for storing media objects. The media service 708 may also provide the account service 704 or the password management service 710 with information corresponding to the media objects such as director, composer, genre, duration, performance, performer or any other information corresponding to the media object. The password management service 710 may generate the authentication information based at least in part on the information received from the media service 708 as described above in connection with FIG. 1. In various embodiments, the password management service may generate a fingerprint of the media object provided by the media service, such as an audio or video fingerprint described above. The fingerprint may be used as the authentication information during authentication of the user and/or registration of user devices. Additionally, the authentication information may be provided to other services of service provides 714.

The password management service 710 may obtain and request information from the product information service 716 or the media service 708 directly or indirectly. Furthermore, the password management service 710 may receive from the computing device 702 an indication of additional information corresponding to a selected media object or additional actions to be performed during authentication. Additionally, the password management service 710 may transmit or receive information from one or more other service providers 714. For example, the password management service 710 may transmit the authentication information to the one or more other service providers 714 in order to enable the user to use the authentication information in connection with the one or more other service providers 714. Furthermore, the one or more other service providers 714 may transmit password requests directly to the password management service.

Figure 8:
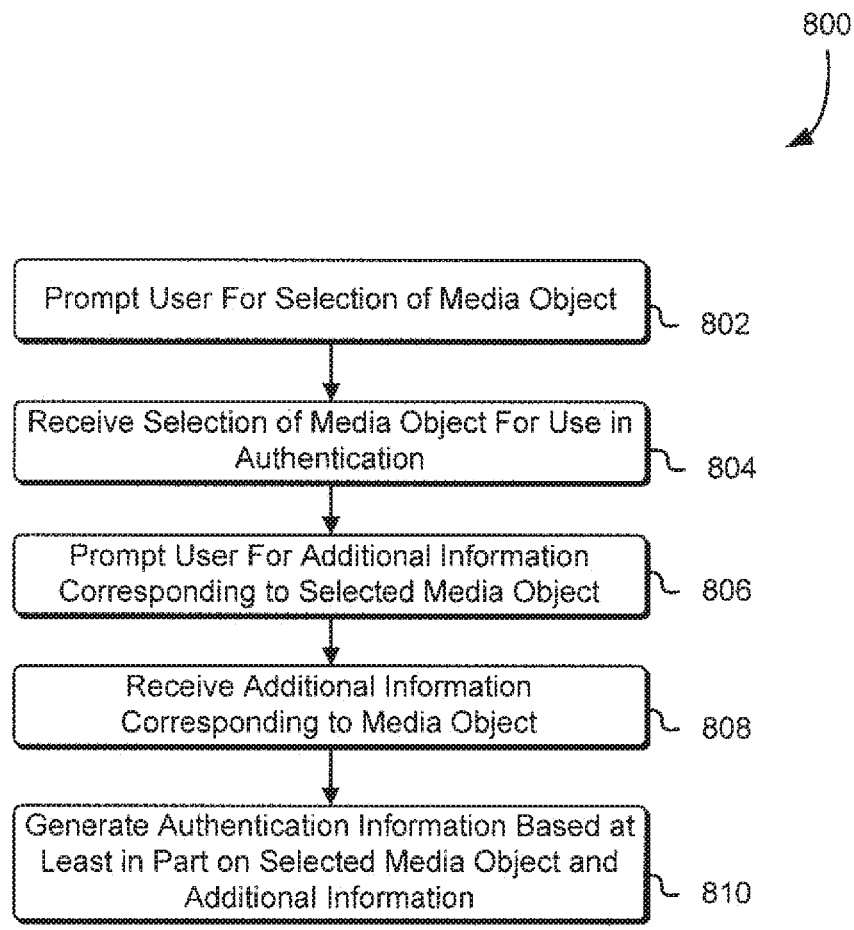
FIG. 8 is an illustrative example of a process for determining authentication information in accordance with an embodiment.

FIG. 8 shows an illustrative example of the process 800 which may be used to generate authentication information based on a media object and additional information corresponding to the media object. The process 800 may be performed by any suitable system such as the password management service described above in connection with FIG. 7. Returning to FIG. 8, in an embodiment, the process 800 includes prompting a user for a selection of a media object 802. The user may be prompted to provide the selection through an interface of an application as described above in connection with FIG. 4. The media objects may include a song, a movie, or any other audio and/or video signal described herein. The password management service may then receive a selection of the media object for use in authentication 804. The selection may be indicated in a request transmitted by a computing device operated by the user. The request may include information corresponding to the selected media object such as a title, identification number, or other information suitable for identifying the selected media object. In various embodiments, the user may transmit the media object to the password management service. For example, the user may record audio and video of the user and transmit the recorded audio and video to the password management service for use as the user's authentication information.

Once the password management service or other computer system has received the selection of the media object, the user may be prompted for additional information corresponding to the media object 806. For example, the user may be prompted for a start point and duration of playback. In another example, the user may be prompted to select particular song lyrics obtained from the selected media object, as illustrated in FIG. 5. The additional information may be used by the password management service in generating the authentication information. The password management service may then receive the additional information corresponding to the media object 808. For example, as illustrated in FIG. 5, once the user has provided the additional information and selected the set password button, the computer system receiving the additional information may then provide the additional information to the password management service.

The password management service may generate the authentication information based at least in part on the selected media object and the additional information 810. For example, the password management service may generate an audio fingerprint to use as authentication information for the user, based at least in part on a song selected by the user and the start point and duration of playback provided by the user. In another example, the password management service may record the user authentication information, such as a movie title selected by the user, a scene selected by the user, and a character's lines from the scene selected by the user. During authentication the user may be authenticated by providing the authentication information, for example, the movie title, scene, and the character's lines recorded by the password management service.

Figure 9:
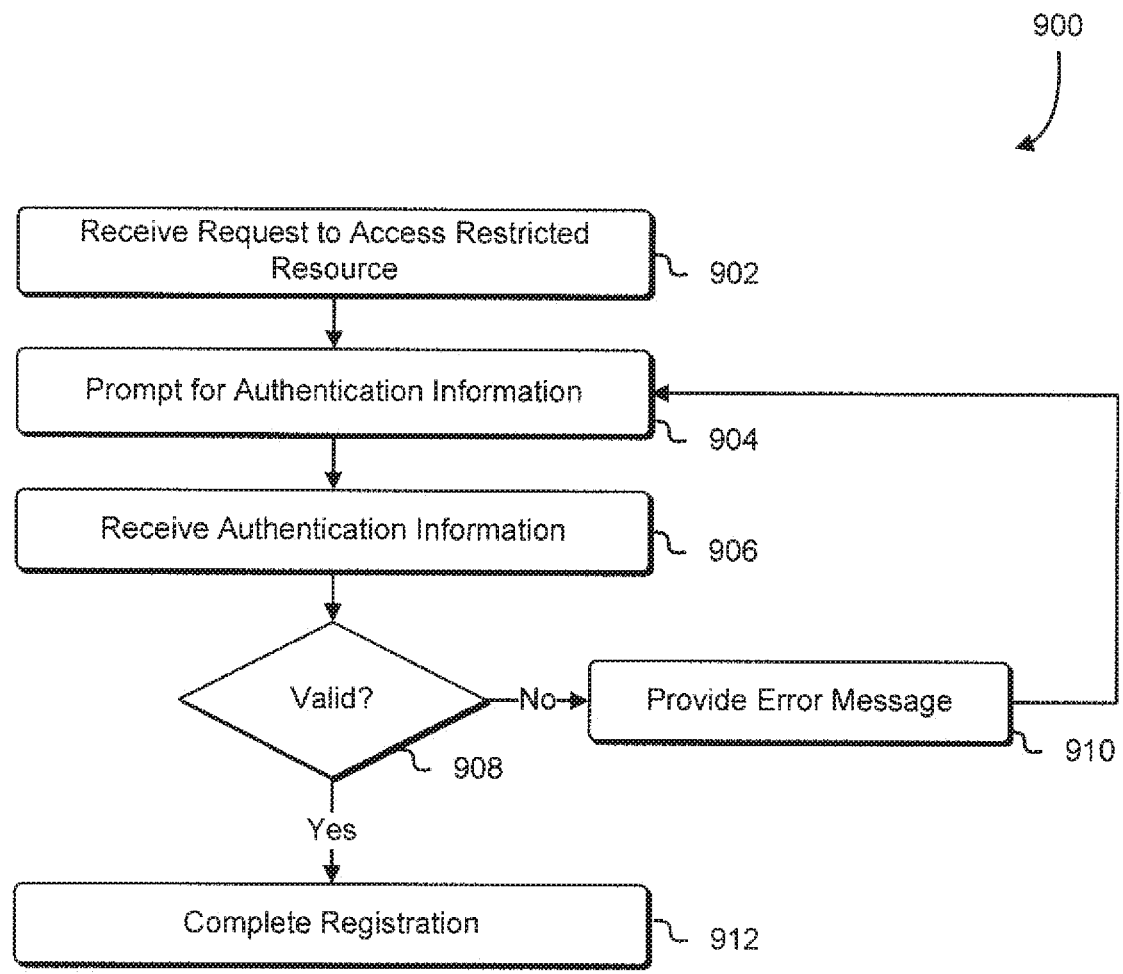
FIG. 9 is an illustrative example of a process for registering a device and/or user account in accordance with an embodiment.

FIG. 9 shows an illustrative example of the process 900 which may be used to register a computing device to a registered user's account. The process 900 may be performed by any suitable system such as the authentication service and/or the computing device described above in connection with FIG. 2. Returning to FIG. 9, in an embodiment, the process 900 includes receiving a request to access restricted resources 902. For example, the computing device may attempt to access restricted resources of a service provider, such as a media streaming service or data storage service. The computing device may attempt to access the restricted resources as part of a boot or initialization operation. For example, the computing device may be booting-up for the first time in the user's home and may attempt to register with a service provider using an account registered to the user. The computing device may prompt for authentication information 904. The authentication information may be configured to authenticate the user to the service provider. As described herein, prompting the user for authentication information may include displaying a set of media objects for selection by the user.

The computing device may receive, through an interface, the user's authentication information 906. For example, the user may utilize a touchscreen of the computing device to provide the authentication information, as illustrated in FIG. 6. Furthermore, as described herein the authentication information may be comprised of a selected media object, additional information, and one or more executed actions. The authentication information may also include an audio fingerprint or video fingerprint. For example, the user may select authentication information on a mobile device, and the mobile device may transmit a fingerprint corresponding to the selected authentication information to the computing device in response to the prompt for authentication information. The computing device may provide the authentication information to the authentication service to determine if the authentication information is valid 908. The computing device may receive, in response, an indication that the authentication information is valid. In numerous variations of the process 900, the computing device is configured to determine whether the received authentication information is valid.

If the authentication information is invalid, the computing device may provide an error message 910. At some point in time after providing the error message, the computing device may prompt the user again for authentication information. The authentication information may be configured such that an amount of inaccuracy in the authentication information provided by the user may not prevent the authentication service from determining the authentication information provided by the user is valid. For example, the start point and end point for playback of a selected media object may have a range of values which may be accepted by the authentication service. The user may select a song and may use a seek bar to set the start point and end points for play back, the seek bar may cause some level of inaccuracy and the authentication service may account for the level of inaccuracy and validate the authentication information if it is within a certain range. If the authentication information is valid, the computing device may complete registration 912. Completing registration may include being granted access to the restricted resources by the computing resource service provider.

Figure 10:
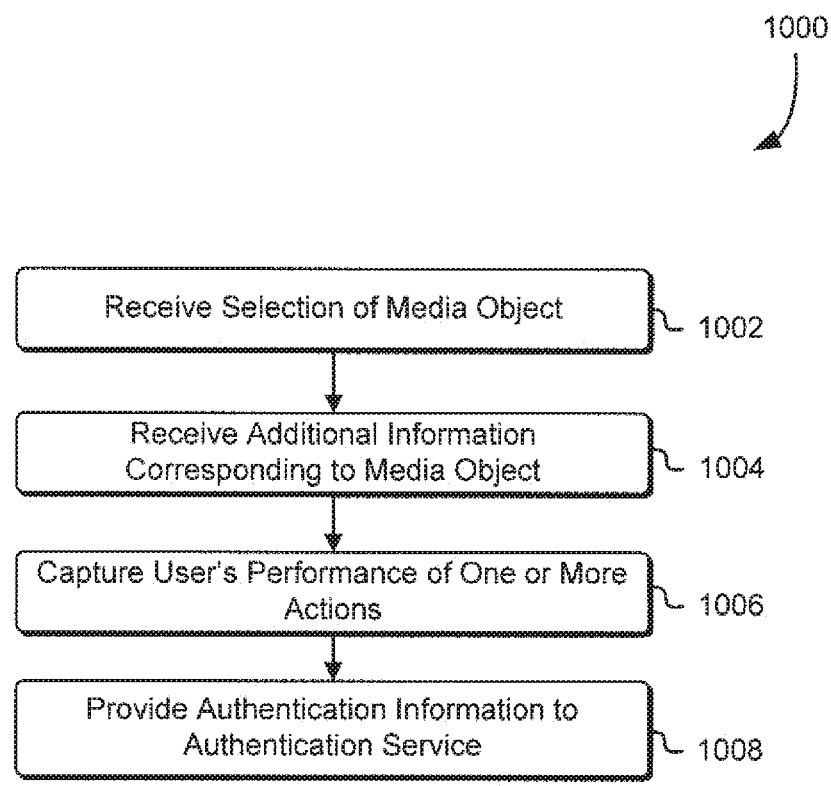
FIG. 10 is a illustrative example of a process for authenticating a user in accordance with an embodiment.

FIG. 10 shows an illustrative example of the process 1000 which may be used to provide authentication information inputted by a user through an interface of a computing device. The process 1000 may be performed by any suitable system such as the authentication service and/or the computing device described above in connection with FIG. 6. Returning to FIG. 10, in an embodiment, the process 1000 includes receiving a selection of a media object 1002. For example, the user may, through an interface of the computing device, such as a touchscreen, select a media object from a set of media objects. The computing device may then receive additional information corresponding to the media object 1004. The additional information may include lines from a scene included in the media object, a verse from the selected media object, a start point for playback, a composer of the media object, or any other information corresponding to the media object suitable for use in the authentication information.

The computing device may then capture the user's performance of one or more actions 1006. For example, as illustrated in FIG. 6, the user may tap out the rhythm of the song. The tapping may be captured by a microphone and/or camera connected to the computing device. Other actions may include acting out a scene from a selected movie or singing a verse from a selected song. The computing device may record the captured performance of the one or more actions and combine the recording with the selected media object and additional information into the authentication information. The computing device may then provide the authentication information to the authentication service 1008. The computing device may provide the authentication information to the authentication service in order to gain access to one or more restricted computing resources. In numerous variations to the process 1000, the computing device may provide the authentication information to one or more other computer systems to enable the one or more other computer systems to access restricted computing resources.

Figure 11:
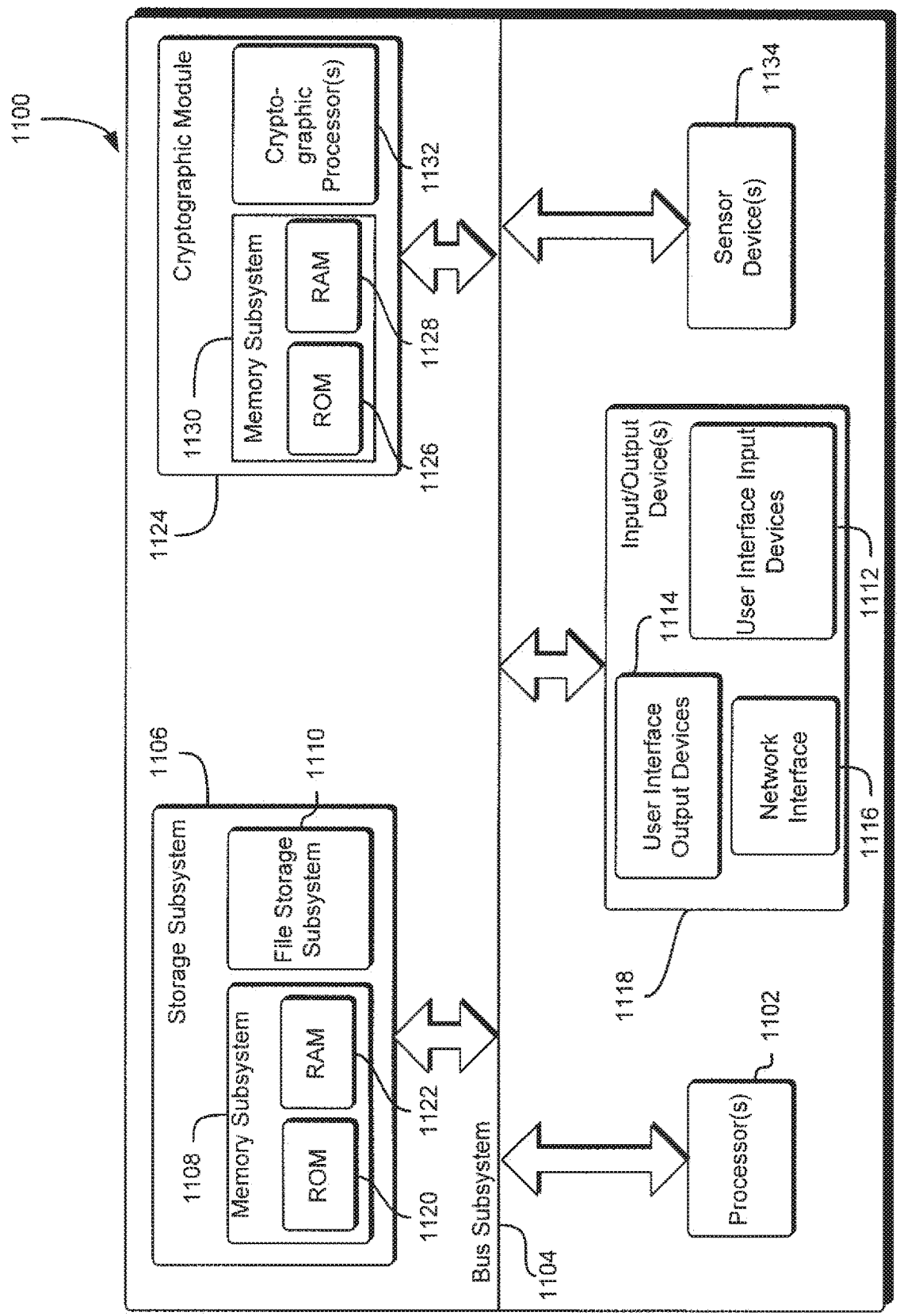
FIG. 11 is a diagram illustrating a computing device in accordance with an embodiment.

FIG. 11 is an illustrative, simplified block diagram of an example device 1100 that may be used to practice at least one embodiment of the present disclosure. In various embodiments, the device 1100 may be used to implement any of the systems illustrated herein and described above. For example, the device 1100 may be used to implement a mobile device and other applications, such as a browser application, in accordance with various embodiments. As shown in FIG. 11, the device 1100 may include one or more processors 1102 that may be configured to communicate with, and are operatively coupled to, a number of peripheral subsystems via a bus subsystem 1104. These peripheral subsystems may include a storage subsystem 1106, comprising a memory subsystem 1108 and a file storage subsystem 1110, one or more input/output devices 1118 including, one or more user interface input devices 1112, one or more user interface output devices 1114, and a network interface subsystem 1116, a cryptographic module 1124, comprising a memory subsystem 1130, and one or more cryptographic processors 1132. The peripheral subsystems may also include one or more sensor devices 1134 in addition to sensors of input devices 1112. Such sensors may include, but are not limited to, GPS sensors, accelerometers, temperature sensors, microphone, camera, and others.

The bus subsystem 1104 may provide a mechanism for enabling the various components and subsystems of the device 1100 to communicate with each other as intended. Although the bus subsystem 1104 is shown schematically as a single bus, alternative embodiments of the bus subsystem may utilize multiple busses.

The network interface subsystem 1116 may provide an interface to other device systems and networks. The network interface subsystem 1116 may serve as an interface for receiving data from and transmitting data to other systems from the device 1100. For example, the network interface subsystem 1116 may enable transmission of application data and other information, such as electronic requests to access a system (e.g., receive a webpage) and may enable receipt of responses to the requests, such as webpages or other information. The network interface subsystem 1116 may also facilitate the receipt and/or transmission of data on other networks, such as an organization's intranet and/or other networks described below.

The user interface input devices 1112 may include one or more buttons, a keyboard, keypad, pointing devices, such as an integrated mouse, touchpad, or graphics tablet, a scanner, a barcode scanner, a fingerprint scanner, a retinal scanner, a touchscreen incorporated into a display, audio input devices, such as voice recognition systems, microphones, fingerprint readers, retinal scanners and other types of input devices. Further, in some embodiments, input devices may include devices usable to obtain information from other devices, such as authentication information, as described above. Input devices may include, for instance, magnetic or other card readers, one or more USB interfaces, near field communications (NFC) devices/interfaces and other devices/interfaces usable to obtain data (e.g., long-term or short-term credentials) from other devices. In general, use of the term "input device" is intended to include all possible types of devices and mechanisms for inputting information to the device 1100.

User interface output devices 1114, if any, may include a display subsystem, or non-visual displays, such as audio and/or tactile output devices, etc. Generally, the output devices 1114 may invoke one or more of any of the five senses of a user. The display subsystem may be a flat-panel device, such as a liquid crystal display (LCD), light emitting diode (LED) display, or a projection or other display device. In general, use of the term "output device" is intended to include all possible types of devices and mechanisms for outputting information from the device 1100. The output device(s) 1114 may be used, for example, to present user interfaces to facilitate user interaction with applications performing processes described herein and variations therein, when such interaction may be appropriate. While a device 1100 with user interface output devices is used for the purpose of illustration, it should be noted that the device 1100 may operate without an output device, such as when the device 1100 is operated in a server rack and, during typical operation, an output device is not needed.

The storage subsystem 1106 may provide a computer-readable storage medium for storing the basic programming and data constructs that may provide the functionality of at least one embodiment of the present disclosure. The applications or components thereof (programs, code modules (i.e., programming modules), instructions) that, when executed by one or more processors, may provide the functionality of one or more embodiments of the present disclosure, may be stored in the storage subsystem 1106. These application modules or instructions may be executed by the one or more processors 1102. The storage subsystem 1106 may additionally provide a repository for storing data used in accordance with the present disclosure. The storage subsystem 1106 may comprise a memory subsystem 1108 and a file/disk storage subsystem 1110. The memory subsystem 1108 may include a main random access memory (RAM) 1122 for storage of instructions and data during program execution and a read only memory (ROM) 1120 for storing sensitive data.

The cryptographic module 1124, which may be a trusted platform module (TPM), includes a memory subsystem 1130, including a main random access memory (RAM) 1128 for storage of instructions and data during program execution and a read only memory (ROM) 1126, in which fixed cryptographic information may be stored, such as a hardware secret stored securely within the device 1100 so as to be non-exportable (i.e., inaccessible through any call to the cryptographic module 1124). The cryptographic module 1124, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference. The device 1100 may also store cryptographic keys in RAM 1128 and/or processor registers for temporary cryptographic processing. The cryptographic information stored in memory may be used in combination with cryptographic information obtained via the network interface 1116 and/or one or more of the user interface input devices 1112. The one or more cryptographic processors may be used to perform cryptographic operations in the device and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include, but are not limited to, algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to, those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure. Generally, one or more components of the cryptographic module 1124 may be configured to collectively perform various operations used generating cryptographically verifiable information for authentication objects.

In various embodiments of the present disclosure, hardware secrets, such as authentication information, are securely stored within the cryptographic module 1124. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

Figure 12:
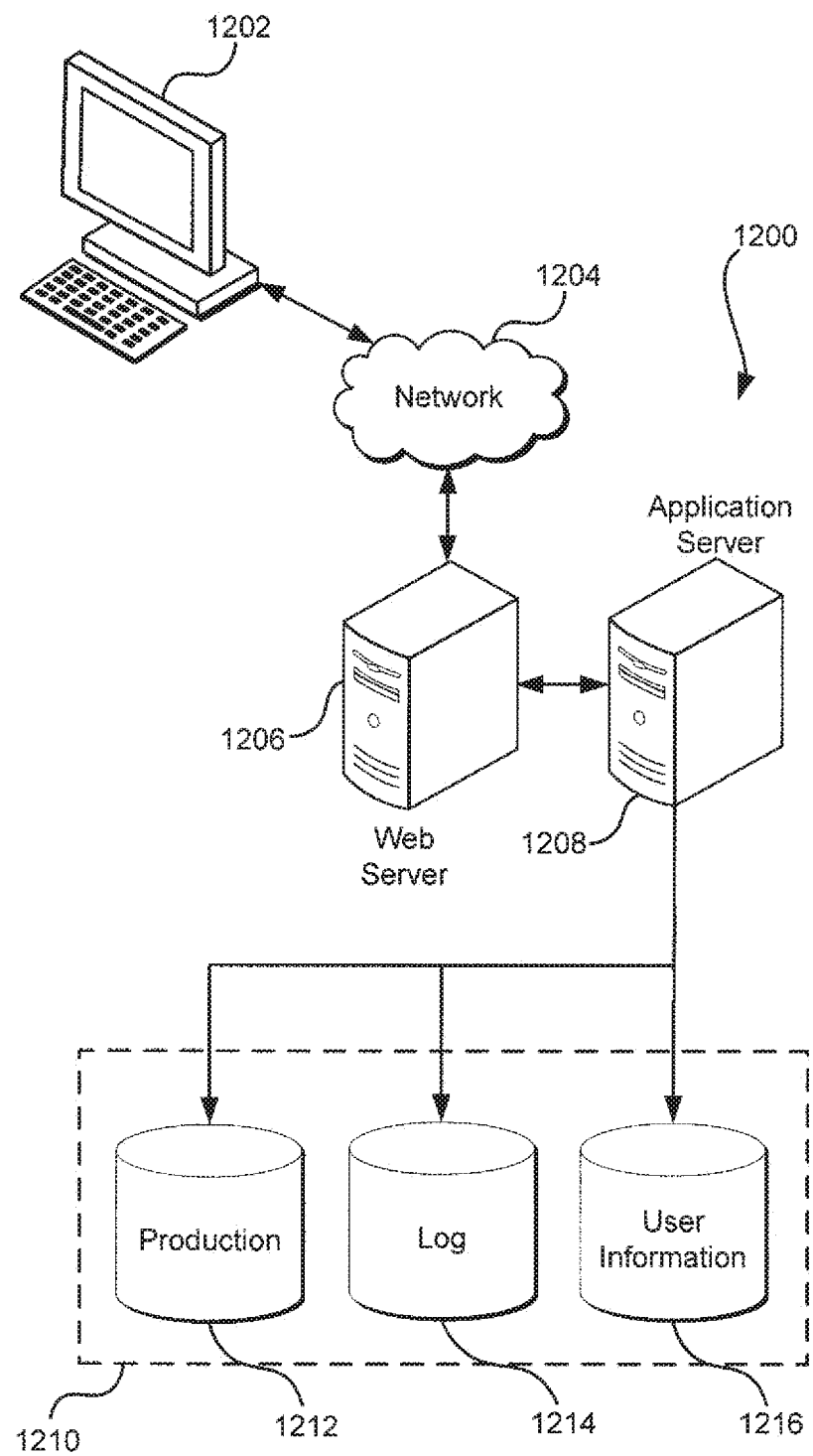
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1202 and the application server 1208, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising: receiving, through a user interface, a first selection of a segment of a first media object from a plurality of stored media objects; generating authentication reference information based at least in part on the selected segment of the first media object, the generated authentication reference information useable to validate an authentication claim; receiving the authentication claim from a computing device associated with a user, the received authentication claim including a second selection of a second media object from the plurality of stored media objects and a selection of a segment of the second media object, the segment of the second media object including one or more audio portions and a playback time;

causing the computing device to initiate playback of the segment of the second media object without the one or more audio portions; receiving, from the computing device, one or more interactions in response to the playback of the segment of the second media object; validating the received authentication claim by at least determining that the one or more interactions in response to the playback of the segment of the second media object matches one or more corresponding audio portions of the selected segment of the first media object of the generated authentication reference information; and authenticating the user based at least in part on the validation.

2. The computer-implemented method of claim 1, wherein the first media object comprises an audio file, the second media object comprises another audio file, the authentication reference information comprises information specifying a user selection of a first playback time of the audio file, and the authentication claim includes information specifying a user selection of a second playback time of the other audio file.

3. The computer-implemented method of claim 1, wherein the received authentication claim includes a recording of the user, where the recording corresponds to an action performed by the user in connection with the second media object.

4. The computer-implemented method of claim 1, wherein the computer-implemented method further includes registering the computing device with a user account corresponding to the user and managed by a service provider as a result of authenticating the user.

5. The computer-implemented method of claim 1, wherein validating the received authentication claim includes determining whether a finger print of the second media object included in the authentication claim matches a finger print of the first media object.

6. A system, comprising:
one or more processors; and
memory with instructions that, as a result of execution by the one or more processors, cause the system to:
receive a selection of a media object, a selection of a segment of the media object comprising one or more media portions and a playback time;
receive an authentication claim associated with a request to access restricted computing resources of the system, the authentication claim including selection of a second media object, a selection of a segment of the second media object;
cause a user interface of a computing device to present the segment of the second media object without one or more media portions associated with the second media object;
as a result of the segment of the second media object without the one or more media portions being presented, obtain information associated with the segment of the second media object; and
if the information associated with the selected segment of the second media object matches the one or more media portions corresponding to the selected segment of the media object, determine that an authentication reference information matches the authentication claim.

7. The system of claim 6, wherein the system further includes instructions that, as a result of execution by the one or more processors, cause the system to provide access to the restricted computing resources by performing a set of operations that includes registering a user device with a service provider such that the service provider enables the registered user device to access the system, the user device associated with the received request.

8. The system of claim 6, wherein the system further includes instructions that, as a result of execution by the one or more processors, cause the system to determine that the authentication reference information matches the authentication claim by at least determining that the information associated with the segment indicates a selection of a start point for playback through a graphical user interface element configured as a seek bar.

9. The system of claim 6, wherein the system further includes instructions that, as a result of execution by the one or more processors, cause the system to determine that the authentication reference information matches the authentication claim by at least determining that the information associated with the segment indicates input from an input device in accordance with a rhythm associated with the media object.

10. The system of claim 6, wherein the system further includes instructions that, as a result of execution by the one or more processors, cause the system to determine that the authentication reference information matches the authentication claim by at least determining that the information associated with the segment indicates input from an input device in accordance with a user's physical reaction to playback of the media object.

11. The system of claim 6, wherein the additional information corresponding to the selected media object further includes information specifying a start point for playback of the media object.

12. The system of claim 11, wherein the system further includes instructions that, as a result of execution by the one or more processors, cause the system to determine a range of values for the start point for playback that if included in the authentication claim enables the system to determine that the authentication reference information matches the authentication claim.

13. The system of claim 6, wherein the system further includes instructions that, as a result of execution by the one or more processors, cause the system to provide a set of media objects from a library of media objects, the selection of the media object being from among the set of media objects.

14. A non-transitory computer-readable storage medium having stored thereon executable instructions that, as a result of execution by one or more processors of a computer system, cause the computer system to at least: obtain a user selection of a media object selected from a plurality of media objects and a selection of a segment of the media object the segment of the media object including one or more text portions and a playback time, cause playback of the segment of the media object on a computing device, the playback excluding the one or more text portions of the segment of the media object, generate an authentication claim based at least in part on user actions performed in response to the playback of the segment of the media object that excludes the one or more text portions, wherein an initial selection of a segment of another media object was previously provided to determine whether information indicated by the user actions performed in response to the playback matches one or more corresponding text portions of the other media object; and provide the generated authentication claim.

15. The non-transitory computer-readable storage medium of claim 14, wherein the instructions that cause the computer system to capture, from a user input device, user input corresponding to an action of the user associated with the computer system, wherein an initial indication of an action to be performed corresponding to the other media object was previously provided.

16. The non-transitory computer-readable storage medium of claim 14, wherein the instructions further comprise instructions that, as a result of execution by the one or more processors, cause the computer system to, during initialization of the computer system, determine a service provider to provide the generated authentication claim in order to register the computer system with the service provider.

17. The non-transitory computer-readable storage medium of claim 14, wherein the instructions further comprise instructions that, as a result of execution by the one or more processors, cause the computer system to: receive information corresponding to the plurality of media objects from a service provider; and provide information corresponding to the user selection of the segment of the selected media object of the plurality of media objects to the service provider.

18. The non-transitory computer-readable storage medium of claim 15, wherein the instructions that cause the computer system to capture, from the user input device, user input corresponding to the action of the user associated with the computer system further include instructions that cause the computer system to capture a selected scene from the media object and at least a portion of dialog from the selected scene.

19. The non-transitory computer-readable storage medium of claim 14, wherein the instructions that cause the computer system to capture, user input corresponding to the action of the user associated with the computer system further include instructions that cause the computer system to record the user performing the action using one or more sensors connected to the computer system.

20. The non-transitory computer-readable storage medium of claim 14, wherein the instructions that cause the computer system to generate an authentication claim further include instructions that cause the computer system to determine a finger print of the media object and include the finger print of the media object in the authentication claim.

21. The non-transitory computer-readable storage medium of claim 15, wherein the instructions further comprise instructions that, as a result of execution by the one or more processors, cause the computer system to execute playback of the user selection of the segment of the media object before capturing the user input.

* * * * *